US011360907B2

(12) United States Patent
Shi et al.

(10) Patent No.: US 11,360,907 B2
(45) Date of Patent: Jun. 14, 2022

(54) METHODS AND APPARATUS TO PROTECT MEMORY FROM BUFFER OVERFLOW AND/OR UNDERFLOW

(71) Applicant: Intel Corporation, Santa Clara, CA (US)

(72) Inventors: Junjing Shi, Shanghai (CN); Qin Long, Shanghai (CN); Liming Gao, Shanghai (CN); Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/490,523

(22) PCT Filed: Mar. 30, 2017

(86) PCT No.: PCT/CN2017/078865
§ 371 (c)(1),
(2) Date: Aug. 30, 2019

(87) PCT Pub. No.: WO2018/176339
PCT Pub. Date: Oct. 4, 2018

(65) Prior Publication Data
US 2020/0125497 A1 Apr. 23, 2020

(51) Int. Cl.
*G06F 12/0893* (2016.01)
*G06F 21/12* (2013.01)
(Continued)

(52) U.S. Cl.
CPC .......... *G06F 12/0893* (2013.01); *G06F 8/434* (2013.01); *G06F 12/14* (2013.01); *G06F 21/125* (2013.01); *G06F 2212/1041* (2013.01)

(58) Field of Classification Search
CPC .... G06F 12/14; G06F 12/0893; G06F 21/125; G06F 8/434; G06F 2212/1041
See application file for complete search history.

(56) References Cited

U.S. PATENT DOCUMENTS 7,818,729 B1 * 10/2010 Plum .................. G06F 11/3624
717/140
2008/0222397 A1 * 9/2008 Wilkerson .......... G06F 12/1483
712/220
(Continued)

FOREIGN PATENT DOCUMENTS

CN 105302712 A 2/2016

OTHER PUBLICATIONS

Ramakesavan et al., Intel® Memory Protection Extensions (Intel® MPX) Enabling Guide, Intel Corporation (Year: 2015).*
(Continued)

*Primary Examiner* — Kalpit Parikh
(74) *Attorney, Agent, or Firm* — Hanley, Flight & Zimmerman, LLC

(57) ABSTRACT

A disclosed example to protect memory from buffer overflow or underflow includes defining an implicit bound pointer based on an implicit bound pointer definition in a configuration file for a memory region; instrumenting object code with an implicit buffer bound check based on the implicit bound pointer; and generating hardened executable object code based on the object code, the implicit buffer bound check, and the implicit bound pointer, the implicit bound pointer located in the hardened executable object code during a compilation phase to facilitate loading the implicit bound pointer in a global bounds table during runtime for access by the implicit buffer bound check.

28 Claims, 10 Drawing Sheets

(51) Int. Cl.
*G06F 12/14* (2006.01)
*G06F 8/41* (2018.01)

(56) References Cited

U.S. PATENT DOCUMENTS

2016/0103693 A1* 4/2016 Berlin .................. G06F 9/4401
719/327
2016/0110542 A1 4/2016 Shanbhogue et al.
2016/0147466 A1 5/2016 Yazdani et al.

OTHER PUBLICATIONS

Intel® Memory Protection Extensions Enabling Guide Version 1.01, Apr. 1, 2016. (Year: 2016).*
Serebryany, "[cfe-dev] GCC's -fmpx in clang?," available online Sep. 15, 2014, retrieved from the Internet Nov. 8, 2019 [http://lists.llvm.org/pipermail/cfe-dev/2014-September/039098.html], 2 pages.
INTEL, "Intel® 64 and IA-32 Architectures Software Developer's Manual," vol. 1, Ch. 16 ("Intel® Memory Protection Extensions (Intel® MPX)"), Apr. 2016, (33 pages).
Serebryany, "AddressSanitizerIntelMemoryProtectionExtension," Google/sanitizers Wiki, posted Jan. 11, 2016, 10 pages. Retrieved from the Internet on Nov. 8, 2019 [http://github.com/google/sanitizers/wiki/AddressSanitizerIntelMemoryProtectionExtensions].
Microsoft Research, "Checked C—Microsoft Research," available online Dec. 14, 2016, 2 pages. Retrieved from the Internet on Nov. 8, 2019 [https://web.archive.org/web/20161214111332/https://www.microsoft.com/en-us/research/project/checked-c/].
Pelner, "EDKII Platform Configuration Database Entries—An Introduction to PCD Entries," Intel White Paper, May 2011, 11 pages.
Microsoft Docs, "Hardware Security Testability Specification," Oct. 10, 2018, 10 pages. Retrieved from the Internet on Nov. 8, 2019 [https://docs.microsoft.com/en-us/windows-hardware/test/hlk/testref/hardware-security-testability-specification].
Fanjiang Pei, "How to Protect Apps from Buffer Overflow Attacks," Aug. 26, 2016, 8 pages. Retrieved from the Internet on Nov. 8, 2019 [https://software.intel.com/en-us/articles/intel-memory-protection-extensions-on-windows-10-a-tutorial].
INTEL, "Intel® 64 and IA-32 Architectures Software Developer's Manual," vol. 1, Ch. 17 ("Intel® Memory Protection Extensions (Intel® MPX)"), Dec. 2016, 29 pages.
Wikipedia, "Intel MPX," Mar. 4, 2017 revision, 2 pages. Retrieved from the Internet on Nov. 8, 2019 [https://en.wikipedia.org/w/index.php?title=Intel_MPX&oldid=768612751].
INTEL, "Intel® Memory Protection Extensions (Intel® MPX) support in the GCC compiler," Jan. 20, 2016 revision, 17 pages. Retrieved from the Internet on Nov. 8, 2019 [http://gcc.gnu.org/wiki/Intel%20MPX%20support%20in%20the%20GCC%20compiler?action=recall&rev=11].
INTEL, "Intel® Memory Protection Extensions Enabling Guide," Rev. 1.01, Apr. 1, 2016, 53 pages.
Oleksiuk, "My aimful life: Exploiting SMM callout vulnerabilities in Lenovo firmware," posted Feb. 24, 2016, 29 pages. Retrieved from the Internet on Nov. 8, 2019 [http://blog.cr4.sh/2016/02/exploiting-smm-callout-vulnerabilities.html].
Dmytro Oleksiuk, "My aimful life: Exploring and exploiting Lenovo firmware secrets," posted Jun. 28, 2016, (39 pages). Retrieved from the Internet on Nov. 8, 2019 [http://blog.cr4.sh/2016/06/exploring-and-exploiting-lenovo.html].
"SMI Transfer Monitor (STM)," Intel Architecture Firmware Resource Center, available Sep. 12, 2015, (1 page). Retrieved from the Internet on Nov. 8, 2019. [https://web.archive.org/web/20150912195720/https://firmware.intel.com/content/smi-transfer-monitor-stm].
INTEL, "SMI Transfer Monitor (STM) User Guide," Revision 1.0, Aug. 2015, 118 pages.
Tal et al., "Using Intel® MPX with the Intel® Software Development Emulator," Jul. 23, 2013, 3 pages. Retrieved from the Internet on Jan. 24, 2020. [https://web.archive.org/web/20131016064537/http://software.intel.com/en-us/articles/using-intel-mpx-with-the-intel-software-development-emulator].
Microsoft, "Windows SMM Security Mitigations Table," Version 1.0, Apr. 18, 2016, 9 pages. Retrieved from the Internet on Nov. 8, 2019. [http://download.microsoft.eom/download/1/8/A/18A21244-EB67-4538-BAA2-1A54EOE490B6/WSMT.docx].
INTEL, "Intel® Software Guard Extensions: Developer Guide," 2016, 35 pages.
Selvaraj, "Overview of Intel® Software Guard Extension Enclaves," Intel Software Developer Zone, Jun. 6, 2016, 16 pages. Retrieved from the Internet on Nov. 14, 2019 [https://software.intel.com/en-us/blogs/2016/06/06/overview-of-intel-software-guard-extension-enclave].
"Clang 5 Documentation: AddressSanitizer," Google Sanitizers Wiki, Available Mar. 29, 2017 edition, 4 pages. Retrieved from the Internet on Dec. 19, 2019. [https://web.archive.org/web/20170329155536/http://clang.llvm.org/docs/AddressSanitizer.html].
Microsoft Docs, "Hardware Security Testability Specification," Available Mar. 31, 2016, 10 pages. Retrieved from the Internet on Dec. 19, 2019 [https://web.archive.org/web/20160331055801/https://msdn.microsoft.com/en-us/library/windows/hardware/dn879006.aspx].
International Searching Authority, "International Search Report," dated Dec. 29, 2017 in connection with International Patent Application No. PCT/CN2017/078865, 3 pages.
International Searching Authority, "Written Opinion," dated Dec. 29, 2017 in connection with International Patent Application No. PCT/CN2017/078865, 3 pages.

* cited by examiner

```
int main(int argc, char **argv) {
    int *ptr1, *ptr2;
    int array[3] = {1, 2, 3};
    SMRAMBoundPointerAddress= PcdGetPtr(SMRAMBoundPointerAddress);
    __Uefi_load_bounds (Bnd0, SMRAMBoundPointerAddress);
    ptr1 = array;
    ptr2 = ptr1;
    return ptr2[3];
    __chk_lbounds (Bnd0, &ptr2[3]);   // check ptr[3] low bound
    __chk_ubounds (Bnd0, &ptr2[3]+sizeof(int) -1);
}
```

STACK-BASED IMPLICIT GLOBAL BOUNDS CHECK

FIG. 4

```
int main(int argc, char **argv) {
    int *ptr1, *ptr2;
    int array[3] = {1, 2, 3};
    __make_bounds (array, sizeof(int)*3);
    __load_bounds (Bnd0, array)
    SMRAMBoundPointerAddress= PcdGetPtr(SMRAMBoundPointerAddress);
    __Uefi_load_bounds (Bnd3, SMRAMBoundPointerAddress);
    ptr1 = array;
    ptr2 = ptr1;
    return ptr2[3];
    __chk_lbounds (Bnd0, &ptr2[3]);   // check ptr[3] low bound
    __chk_ubounds (Bnd0, &ptr2[3]+sizeof(int) -1);
    __chk_lbounds (Bnd3, &ptr2[3]);   // check ptr[3] low bound
    __chk_ubounds (Bnd3, &ptr2[3]+sizeof(int) -1);   // check ptr[3] high bound, and fail
}
```

STACK-BASED EXPLICIT AND IMPLICIT GLOBAL BOUNDS CHECK

FIG. 5

```
int main(int argc, char **argv) {
    int *ptr1, *ptr2;
    ptr1 = malloc(sizeof(int)*3);
    SMRAMBoundPointerAddress= PcdGetPtr(SMRAMBoundPointerAddress);
    __Uefi_load_bounds (Bnd0, SMRAMBoundPointerAddress);
    ptr2 = ptr1;
    return ptr2[3];
    __chk_lbounds (Bnd0, &ptr2[3]);    // check ptr[3] low bound
    __chk_ubounds (Bnd0, &ptr2[3]+sizeof(int) -1);
}
```

HEAP-BASED IMPLICIT GLOBAL BOUNDS CHECK

FIG. 6

```
__mpx_wrapper_malloc (size_t size) { void *p = malloc(size);

make_bounds (p, size);      ⎱ 702
    load_bounds (Bnd0, p);

return p;
}
```

```
int main(int argc, char **argv) { int *ptr1, *ptr2;

ptr1 = __mpx_wrapper_malloc (sizeof(int)*3);          ⎱ 604

SMRAMBoundPointerAddress= PcdGetPtr(SMRAMBoundPointerAddress);
    __Uefi_load_bounds (Bnd3, SMRAMBoundPointerAddress);  ⎱ 606 ptr2 = ptr1;                                          ⎱ 604
    return ptr2[3];

chk_lbounds (Bnd0, &ptr2[3]);   // check ptr[3] low bound                    ⎱ 702
    chk_ubounds (Bnd0, &ptr2[3]+sizeof(int) -1);  // check ptr[3] high bound, and fail chk_lbounds (Bnd3, &ptr2[3]);   // check ptr[3] low bound                    ⎱ 606
    chk_ubounds (Bnd3, &ptr2[3]+sizeof(int) -1);

}
```

— 602
— 704
— 700

HEAP-BASED EXPLICIT AND IMPLICIT GLOBAL BOUNDS CHECK

FIG. 7

METHODS AND APPARATUS TO PROTECT MEMORY FROM BUFFER OVERFLOW AND/OR UNDERFLOW

FIELD OF THE DISCLOSURE

The present disclosure relates generally to memory in processor systems and, more particularly, to methods and apparatus to protect memory from buffer overflow and/or underflow.

BACKGROUND

Processor systems including computers, tablets, mobile devices, Internet appliances, and other computing and/or connected devices are provided with memory to store instructions and/or data. Such memory is often partitioned or allocated into different memory spaces that serve different purposes. In some devices, a protected memory space is created to store and protect critical system instructions and/or data that is intended to be accessed only by processes having a high privilege level. Access to such protected memory space enables controlling many aspects of a device, some of which include accessing secure data and/or secure processes in other memory spaces.

Parties desiring to access secure data and/or processes on processor systems in an unauthorized manner employ a number of malicious techniques for accomplishing such accesses. Such techniques include causing target devices to execute malicious code that exploits weak memory protections that are prone to buffer overflow or underflow. For example, malicious code may be programmed with instructions to perform a data access in an unprotected memory space neighboring a protected memory space. By specifying a data access length when accessing a memory address in the unprotected memory space that crosses into the protected memory space, the malicious code can intentionally cause a buffer overflow to read and/or write data in the protected memory space. In this manner, the malicious code can write executable code into the protected memory space that is subsequently executed as a highly privileged process that can take control of the target device in a manner not intended by the original developer.

BRIEF DESCRIPTION OF THE DRAWINGS

FIG. 4 is example pseudocode representative of machine readable instructions that include a stack-based implicit global bounds check created by the example apparatus of FIG. 2 using a compiler optimization process in accordance with the teachings of this disclosure.

FIG. 5 is example pseudocode representative of machine readable instructions that include a stack-based implicit global bounds check created by the example apparatus of FIG. 2 using a compiler optimization process in accordance with the teachings of this disclosure after a compiler optimization process creates an explicit global bound check.

FIG. 6 is example pseudocode representative of machine readable instructions that include a heap-based implicit global bound check in accordance with the teachings of this disclosure.

FIG. 7 is example pseudocode representative of machine readable instructions that include a heap-based implicit global bound check in accordance with the teachings of this disclosure after a compiler optimization process creates an explicit global bound check.

The figures are not to scale. Wherever possible, the same reference numbers will be used throughout the drawing(s) and accompanying written description to refer to the same or like parts.

DETAILED DESCRIPTION

Figure 1:
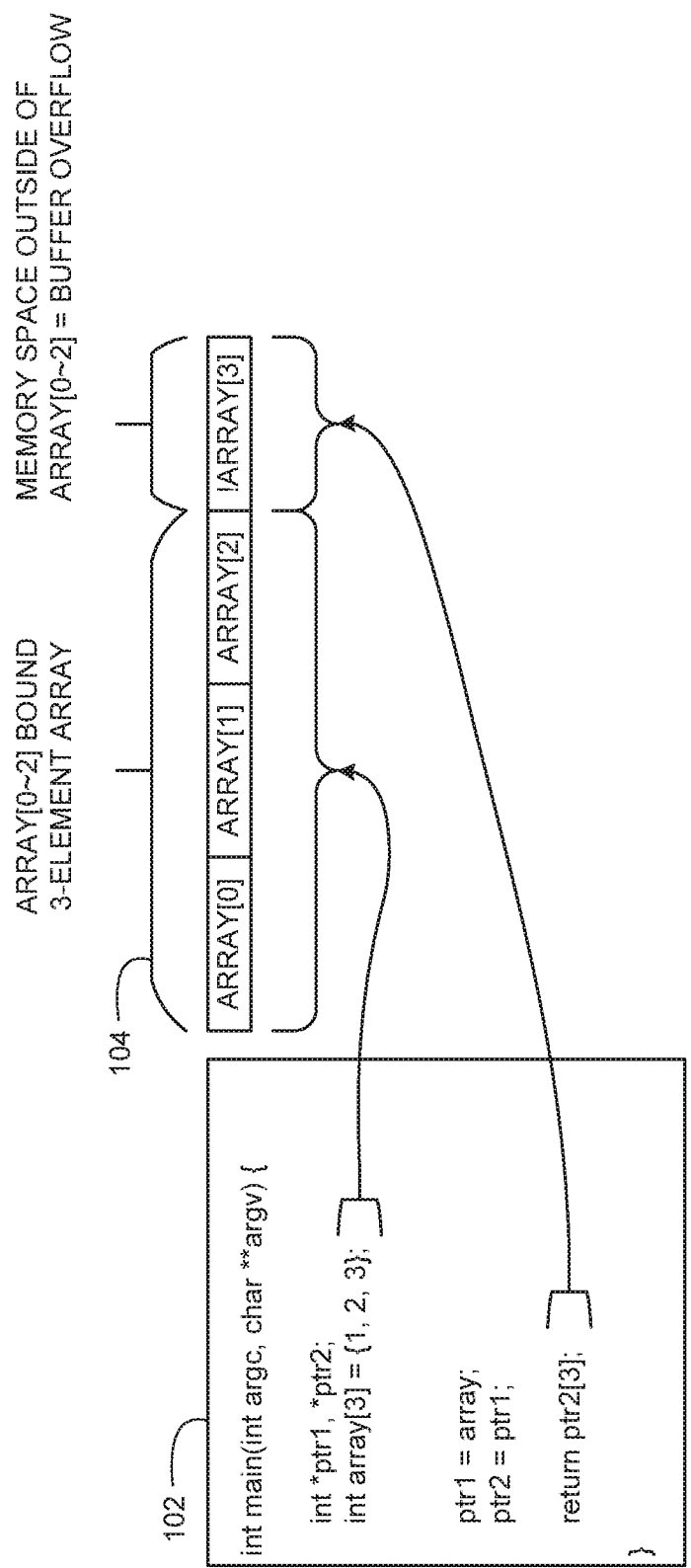
FIG. 1 illustrates an example use of pointers in a program that causes a buffer overflow condition when performing a memory access on a data array.

Examples disclosed herein may be used to protect memory from buffer overflow and/or underflow conditions. In prior processor systems, parties desiring to access secure data and/or processes on processor systems in an unauthorized manner may employ a buffer overflow/underflow technique. To exploit a buffer overflow/underflow condition, a target device is caused to execute malicious code to perform a data access in an unprotected memory space neighboring a protected memory space. By specifying a data access length that crosses into the protected memory space, the malicious code can read and/or write data in the protected memory space based on a permitted data access that starts in the unprotected memory space. In this manner, the malicious code can write executable code into the protected memory space that is subsequently executed as a highly privileged process that can take control of the target device in a manner not intended by the original developer.

The system software world is plagued by buffer overflow/underflow occurrences, especially in isolated execution environments like System Management Mode (SMM). For example, SMM is a privileged operating mode of some processors (e.g., x86 and IA-64 processors) in which all normal execution (e.g., operating systems, applications, etc.) is not allowed and in which firmware/basic input-output system (BIOS) executes to perform low-level system management operations. Firmware/BIOS code that is executed in the SMM environment is stored in system management random access memory (SMRAM), which is a protected memory space that can be directly accessed by only authorized processes. Malicious access to such protected memory space could be used to write malicious code into the memory space. In this manner, an attacker could cause the malicious code to be executed in the SMM environment to perform low-level operations to take control of the infiltrated device. Data and instructions stored elsewhere in the device's memory space can then be accessed. In addition, the infiltrated device could be controlled to allow unauthorized access to other network-connected devices in communication with the infiltrated device.

Prior techniques for addressing buffer overflow/underflow vulnerabilities include rewriting (e.g., refactoring) legacy software/firmware (e.g., legacy code) in type safe languages (e.g., C#, RUST, etc.), or to deprivilege code via hypervisors (e.g., an Intel® Scalable Memory Interconnect (Intel® SMI) Transfer Monitor (STM)). However, such techniques are impractical for code (e.g., software or firmware) that includes large quantities of lines of code (e.g., 100,000's of lines of closed and open source C code). Thus, security risks remain in unaddressed legacy code.

Software/firmware code stored in a Security Isolated Region (SIR) (e.g., a BIOS SMRAM memory region, an Intel® Software Guard Extensions (SGX) Enclave memory region, a virtual machine monitor (VMM) memory region, etc.) has domain-specific buffer bounds (e.g., memory bounds) which are implicit constrains defined by corresponding hardware and/or security architectures. Such SIR bounds require that the code stored therein cannot directly perform arbitrary read/write memory accesses outside of the SIR. Instead, such memory accesses outside the SIR are limited to being performed through a specific interface (e.g., an SMM communication buffer). In some cases, the code stored in the SIR is developed using the C programming language. It is well known that C-language programs are susceptible to security vulnerabilities that are facilitated by the lack of buffer bounds checking in the C language. As such, developers using C language may unintentionally read/write information outside of the bounds of the SIR through corrupted pointers which can easily leak data or enable other attacks (e.g., buffer overflow/underflow attacks).

Examples disclosed herein are described in connection with Intel® Memory Protection Extension (MPX) features that are provided as hardware-based capabilities in some Intel® x86 processors and Intel® IA-64 processors. The Intel® MPX features can be used in conjunction with MPX-enabled compiler options to check memory references that are not originally intended to access protected memory spaces for possibilities of being usurped at runtime due to buffer overflow or underflow. Since Intel® MPX memory protection features are hardware based in some processors, examples disclosed herein can be implemented in connection with such Intel® MPX memory protection features to harden or secure application memory accesses in release binaries (e.g., executable object code) without significantly increasing code size or decreasing performance due to leveraging hardware for performing memory bound checks. As such, examples disclosed herein can be used to generate hardened executable object code having lower object code size and better execution performance than can be attained using prior memory protection techniques.

Prior techniques use Intel® MPX memory protection features to implement explicit buffer bound checks corresponding to explicit buffers allocated by a program at runtime. Examples disclosed herein can be used to supplement Intel® MPX memory protection features by implementing implicit buffer bound checks to harden or secure legacy software/firmware components in SIR-stored software/firmware (e.g., SMRAM). SIR buffer bounds are often pre-defined and hard-coded in hardware and correspond to SIR buffers or memory regions that do not need to be explicitly allocated in a program. As such, SIR buffer bounds are typically implicit buffer bounds. In addition, SIR buffer bounds are sometimes referenced using different symbol names across different modules, and cannot be recognized using prior C-language compile techniques. For example, because such SIR buffer bounds are implicit bounds they are not detectable using prior techniques because they do not correspond to explicitly allocated buffers, and they are not associated with a pointer.

In software/firmware programs, explicit buffer bounds differ from implicit buffer bounds based on whether corresponding buffers are explicitly defined in the programs or defined in hardware without needing to be explicitly defined in software/firmware. For example, first object code and second object code can run in separate isolated environments. If the first object code explicitly defines use of a stack buffer (e.g., through a variable definition in the first object code) and a first heap buffer (e.g., through a memory allocation function called in the first object code), and the second object code explicitly defines use of the stack buffer (e.g., through a variable definition in the first object code) and a second heap buffer (e.g., through a memory allocation function called in the first object code), the bounds of the stack buffer and the first and second heap buffers are explicit to an MPX-aware compiler when the source code corresponding to first object code and the second object code is compiled during a compilation phase. As such, the MPX-aware compiler knows that such explicit buffers will be accessed regardless of where the first and second object code binaries are loaded to be executed. As such, the MPX-aware compiler can instrument the first object code and the second object code with explicit buffer bound checking code to check memory accesses in the first object code and the second object code against the known explicit buffer bounds corresponding to the stack buffer, the first heap buffer and the second heap buffer.

However, during execution of the first object code and the second object code in their respective isolated execution environments at runtime, there are often implicit bounds that need to be checked that correspond to implicit buffers of the corresponding execution environments. Such implicit buffers arise from hardware security designs that require use of hardware-defined buffers used to keep sensitive information isolated within respective execution environments and separate from other execution environments. These secure hardware-defined buffers are implicit buffers that have implicit buffer bounds. Because such implicit buffer bounds are hardware defined, they are not explicitly defined by a developer in software/firmware code. That is, implicit buffers are accessible to a program during runtime without needing to include variable definitions or calls to memory allocation functions in software/firmware code. Thus, because implicit buffers are not explicitly defined in software/firmware code such implicit buffer bounds cannot be parsed or inferred from source code (e.g., source code of the first object code and the second object code of the above example). As such, a compiler cannot detect the implicit buffer bounds during a compilation phase and, thus, cannot instrument object code with corresponding implicit buffer bound checks).

Examples disclosed herein may be used to enhance compilers to detect implicit buffer bounds to implement implicit buffer bound checks to prevent buffer overflow/underflow for implicit buffer bounds. For example, techniques disclosed herein can be used with prior compilers equipped with the Intel® MPX memory protection features. Examples disclosed herein can be used to supplement such prior compilers to support implicit buffer bound checks in addition to explicit buffer bound checks (e.g., buffer bound checks of memory bounds corresponding to stack buffers and/or heap buffers). To support checking memory accesses against implicit buffer bounds, examples disclosed herein define additional global pointers through software configuration by providing global pointer definitions in a configuration file at a compilation phase. For example, a developer can create a software configuration (e.g., a module configuration meta file) using platform configuration database (PCD) entries in BIOS, unified extensible firmware interface (UEFI) code, and/or a boot-loader to define additional global pointers in accordance with the teachings of this disclosure. PCD entries may be used to configure subsystem(s) of a computer in association with execution of the BIOS, unified extensible firmware interface (UEFI) code, and/or a boot-loader. As used herein UEFI firmware is a software interface between an operating system (OS) and platform firmware that enables the OS to run on platform hardware and access hardware resources. The additional global pointers are defined in executable object code to create hardened executable object code in which such global pointers are used implement checks of memory accesses against buffer bounds during a runtime phase. For example, a platform driver associates these additional global pointers with SIR implicit buffer bounds during runtime, and stores these buffer bounds in an MPX bound table. In this manner, the additional global pointers can be used to check memory accesses against buffer bounds during execution of hardened executable object code to determine whether such accesses would cause buffer overflow and/or underflow conditions.

In addition, by enabling an MPX-aware compiler to access an implicit buffer bound global pointer definition from the software configuration (e.g., a module configuration meta file) and instrument or implement implicit buffer bound check instructions in executable object code for every memory access against the buffer bounds of the defined global pointer (e.g., SIR implicit bounds), examples disclosed herein can be used to implement new SIR implicit buffer bound checks in combination with prior MPX C-language explicit buffer bound checks. Examples disclosed herein enable doing this without the new SIR implicit buffer bound checks disclosed herein and the prior MPX C-language explicit buffer bound checks being dependent on each other.

Examples disclosed herein facilitate protecting memory spaces (e.g., SIR memory spaces) from being accessed in an unauthorized manner through intentional or unintentional buffer overflows and/or underflows. Unlike some prior techniques, examples disclosed herein do not require developers to manually refactor code. Instead, examples disclosed herein supplement source code compilation by using implicit buffer bound configuration techniques to generate hardened executable object code that checks memory accesses against implicit buffer bounds to prevent buffer overflows and/or underflows. Although some examples disclosed herein are described in connection with the Intel® MPX memory protection features, examples disclosed herein may be implemented without use of the Intel® MPX memory protection features. That is, examples disclosed herein may be used in connection with other hardware-based memory protection features in processors and/or compilers suitable to check memory accesses in code against buffer bounds to prevent buffer overflow and/or underflow conditions.

Examples disclosed herein are useful to software/firmware developers that have previously developed code for which refactoring would be overly burdensome for the task of fixing possible buffer overflow/underflow issues. Since examples disclosed herein eliminate or substantially reduce the need to refactor legacy code to check for buffer overflow/underflow issues, they create scalable memory protection solutions that can be used by developers for legacy code of any size.

An example buffer overflow condition that can be prevented by using examples disclosed herein is shown in FIG. 1. In the example of FIG. 1, use of pointers in a program 102 results in a buffer overflow condition when performing a memory access on a data array 104. The example program 102 defines two pointers as *ptr1 and *ptr2, and defines the three-element data array 104 as array[3]. The program 102 causes a stack buffer overflow when returning the memory reference ptr2[3] (e.g., return ptr2[3]). That is, the three-element data array 104 (e.g., array[0~2]) is allocated three elements (e.g., 0, 1, and 2) in a stack buffer, and is bound by a lower bound of &array[0] and an upper bound of &array[2]+3. The pointer ptr2 points to the three-element data array 104 in the stack buffer. As such, ptr2 should only access array[ ] as ptr2[0], ptr2[1], or ptr2[2]. However, the ptr2[3] reference exceeds the upper bound (e.g., &array[2]+3) by accessing a neighboring fourth element (e.g., shown as !array[3]) that extends beyond the upper bound &array[2]+3 of the data array 104. The access to the neighboring fourth element (e.g., !array[3]) by the ptr2[3] memory reference in the illustrated example of FIG. 1 causes a buffer overflow because defining the three-element data array 104 and accessing data that is not within the buffer bound of the data array 104 results in exposing memory space not intended for access based on the definition of the data array 104.

Examples disclosed herein may be used to implement stack-based implicit buffer bound checks and/or heap-based implicit buffer bound checks in object code. Stack-based implicit buffer bound checks are buffer bound checks on memory accesses corresponding to memory spaces (e.g., variables) allocated in stack memory. Heap-based implicit buffer bound checks are buffer bound checks on memory accesses corresponding to memory spaces (e.g., variables) allocated in heap memory. Stack memory is used for static memory allocation and is managed automatically by a central processing unit (CPU) during runtime. For example, a CPU automatically allocates memory space on the stack for variables of a subroutine and automatically frees the memory space upon exiting the subroutine. Heap memory is used for dynamic memory allocation and is not automatically managed by the CPU. Instead, a program allocates memory space in the heap memory (e.g., using malloc( ) or calloc( ) functions) for variables and frees the memory space when finished (e.g., using a free( ) function) to deallocate the memory space when no longer needed. Both stack memory and heap memory reside on a computer's RAM memory space. Examples of stack-based implicit buffer bound checks implemented in accordance with the teachings of this disclosure are described below in connection with FIGS. 4 and 5. Examples of heap-based implicit buffer bound checks implemented in accordance with the teachings of this disclosure are described below in connection with FIGS. 6 and 7.

Examples disclosed herein may be implemented using basic input-output system (BIOS) firmware instructions and/or UEFI firmware instructions. Both BIOS firmware and UEFI firmware execute as the layer between hardware and an OS, initialize hardware during a system boot process, and enable the OS to access and use hardware resources. BIOS firmware is typically regarded as legacy firmware found on older systems or systems that use 32-bit or lower bit architectures. BIOS does not include a boot loader, but passes control to a boot loader to load and initialize the OS in a computer or other processor system. UEFI firmware is a more recent standard typically used on newer systems and can support higher bit architectures (e.g., 64-bit architectures). Unlike BIOS, UEFI has a boot loader to load and initialize the OS. Although examples are disclosed herein in connection with BIOS firmware and/or UEFI firmware, examples disclosed herein may be implemented using either BIOS firmware or UEFI firmware and/or any other type of firmware including any type of boot loader.

Figure 2:
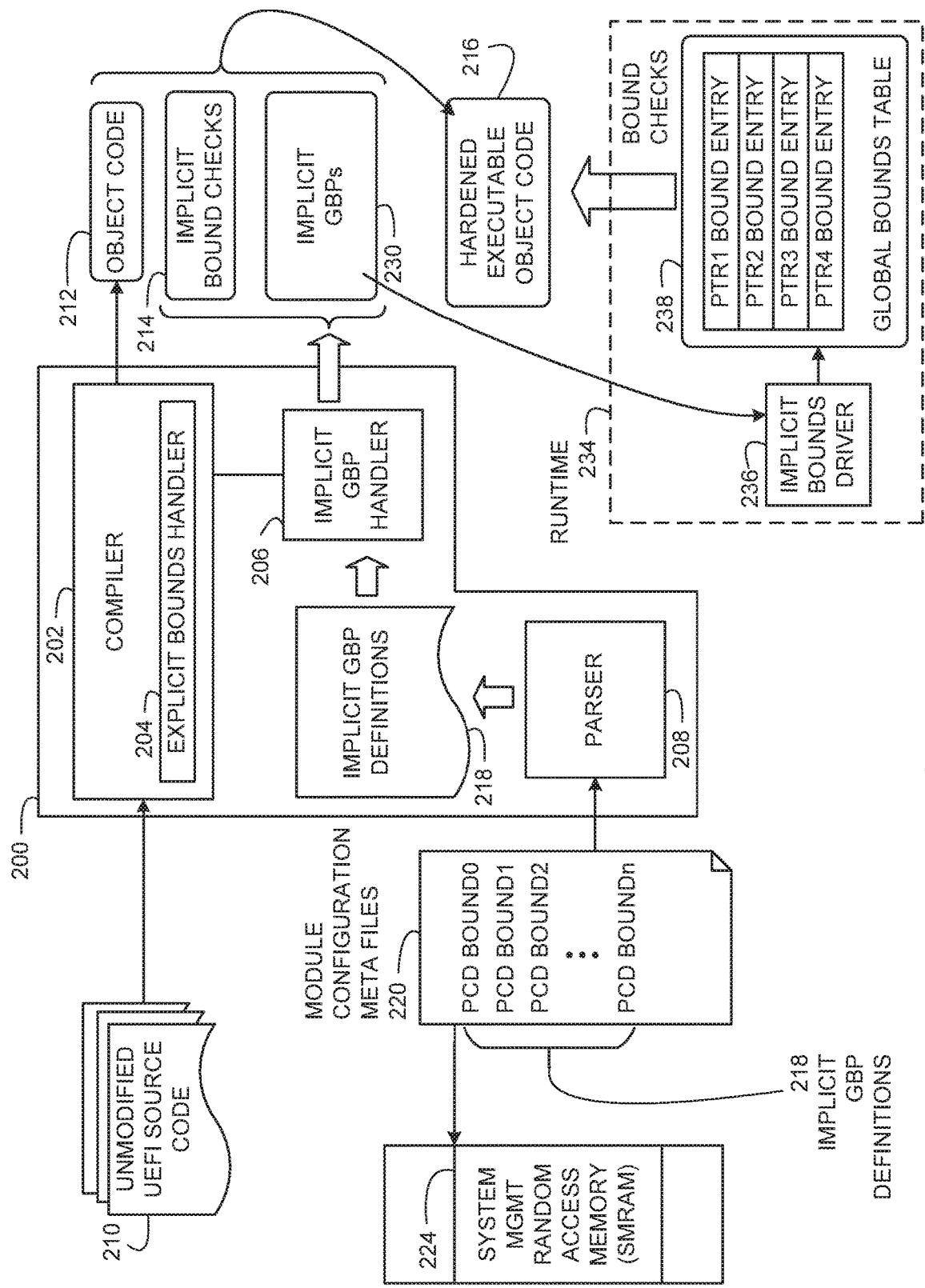
FIG. 2 illustrates an example apparatus that may be used to implement implicit global bound checks to protect memory from buffer overflow and/or underflow conditions in accordance with the teachings of this disclosure.

FIG. 2 illustrates an example apparatus 200 configured to implement implicit bound checks to protect memory from buffer overflow and/or underflow by instrumenting object code with stack-based implicit bound checks and/or heap-based implicit bound checks. The example apparatus 200 includes an example compiler 202, an example explicit bounds handler 204, an example implicit Global Bound Pointer (GBP) handler 206, and an example parser 208. In the illustrated example of FIG. 2, the explicit bounds handler 204 is in the compiler 202, and the implicit GBP handler 206 and the parser 208 are separate from the compiler 202. For example, the implicit GBP handler 206 and the parser 208 may be plug-ins, add-on modules, or executables separate from and in communication with the compiler 202. In some examples, the explicit bound handler 204 may also be separate from the compiler 202. In yet other examples, the explicit bounds handler 204, the implicit GBP handler 206, and the parser 208 may all be incorporated in the compiler 202.

In the illustrated example of FIG. 2, the compiler 202 is an MPX-aware and a UEFI-aware compiler. The example compiler 202 accesses unmodified source code 210, which may be legacy source code or any other source code that does not include implicit bound checks implemented in accordance with the teaching to this disclosure to protect against buffer overflow and/or underflow. The example compiler 202 analyzes and compiles the unmodified source code 210 at a compile time to generate example object code 212. The object code 212 of the illustrated example includes machine instructions generated by the compiler 202 after one or more passes performed by the compiler 202 on the unmodified source code 210. The example explicit bounds handler 204 is provided to analyze memory accesses in code and to create explicit bound checks to protect memory regions from buffer overflows and/or underflows based on explicit buffer bounds. The example explicit bounds handler 204 may be implemented using any prior technique to create explicit bound checks. For example, the explicit bounds handler 204 may be implemented using the Intel® MPX memory protection features for explicit bound checks.

In the illustrated example, the compiler 202 may be a C-language compiler or any other type of programming language compiler. The example compiler 202 may be configured to perform a number of optimization passes in a compilation phase to optimize the object code 212 for different purposes (e.g., object code size, execution speed, explicit bound checks, etc.). In some examples, the compiler 202 is an MPX-aware compiler that uses the explicit bounds handler 204 to insert explicit bound checks in the object code 212 using prior techniques. However, since the object code 212 is based on the unmodified source code 210, the object code 212 does not include implicit bound checks 214 to protect against buffer overflow and/or underflow in accordance with the teachings of this disclosure. In the illustrated example, the implicit GBP handler 206 and the parser 208 are provided to generate hardened executable object code 216 by instrumenting the object code 212 with the implicit bound checks 214 in accordance with the teachings of this disclosure to check for buffer overflows and/or underflows based on stack implicit buffer bounds and/or heap implicit buffer bounds. For example, the implicit GBP handler 206 and the parser 208 may perform one or more additional compiler optimization passes during the compilation phase to create the implicit bound checks 214. In this manner, the hardened executable object code 216 can be executed so that buffer overflows and/or underflows can be prevented during an example runtime phase 234. In examples in which the explicit bounds handler 204 adds explicit bound checks into the object code 212, the implicit bound checks 214 are provided in addition to the explicit bound checks. Examples of instrumenting the object code 212 with the implicit bound checks 214 for stack buffers are described in more detail below in connection with FIGS. 4 and 5. Examples of instrumenting the object code 212 with the implicit bound checks 214 for stack buffers are described in more detail below in connection with FIGS. 6 and 7.

In the illustrated example of FIG. 2, the implicit GBP handler 206 generates the hardened executable object code 216 when one or more implicit buffer bounds are specified by a developer and provided during a compilation phase. In the illustrated example, such implicit buffer bounds are specified in one or more example implicit GBP definitions 218 provided in one or more example module configuration meta files 220. Examples disclosed herein instrument the hardened executable object code 216 with instructions to define implicit buffer bounds as global pointers in a global bounds table 238 at runtime 234 so that they can be accessible at runtime 234 across different modules (e.g., functions, subroutines, processes, etc.) of a program. In this manner, by being defined as global pointers, pointer movement or bound propagation associated with the implicit buffer bounds need not be traced in order to know how to reference the implicit buffer bounds in memory when performing implicit bound checks against such implicit buffer bounds. Unlike such implicit global buffer bounds as used herein, when an explicitly user-created buffer is allocated in memory by a program during runtime, its explicit buffer bounds are not global. This means that the explicit buffer bounds are not accessible in a global bounds table across different functions, subroutines or processes of the program. As such, to be able to perform buffer bound checks against such non-global explicit buffer bounds, pointer movement or bound propagation of the non-global explicit buffer bounds must be traced each time corresponding buffer bound pointers are acted upon in an operation. Such tracing enables tracking where the buffer bound pointers point to in memory so that they can be referenced during corresponding buffer bound checks.

The one or more example implicit GBP definitions 218 of the illustrated example of FIG. 2 define upper and lower buffer bounds of security isolated region (SIR) memory spaces (e.g., protected memory spaces). The example module configuration meta file(s) 220 may be implemented using UEFI module configuration meta files. The implicit GBP definitions 218 may be implemented using platform configuration database (PCD) entries. A PCD entry is a setting which is established during a time that a platform BIOS/boot-loader is built. In the illustrated example, PCD entries may be defined in *.DEC files and/or *.INF files. An example SIR memory area is shown in FIG. 2 as a System Management Random Access Memory (SMRAM) 224. The SMRAM 224 of the illustrated example is a protected memory space that may be used to implement stack memory and/or heap memory. The example SMRAM 224 may be used to store BIOS firmware or UEFI firmware. Many SIR memory regions have implicit buffer bounds.

The parser 208 is provided to parse the implicit GBP definitions 218 based on different SIR memory areas. To create the implicit bound checks 214, the example parser 208 parses the implicit GBP definitions 218 from the module configuration meta file(s) 220 for corresponding SIR memory areas, and provides the heap implicit bound definitions 218 to the implicit GBP handler 206. In the illustrated example, the implicit GBP handler 206 uses the implicit GBP definitions 218 to generate corresponding implicit GBPs 230 that are used by the implicit GBP handler 206 to instrument the example object code 218 with the implicit bound checks 214 to generate the hardened executable object code 216. In addition, the implicit GBP handler 206 incorporates the implicit GBPs 230 in the hardened executable object code 216. In this manner, when the hardened executable object code 216 is released for execution, the implicit GBPs 230 are available during execution of the hardened executable object code 216 at the runtime phase 234 for use in performing the one or more implicit bound checks 214.

An example implicit bounds driver 236 can be provided to a platform OS for use during the runtime phase 234 to facilitate performing bound checks based on the implicit GBPs 230 and the implicit bound checks 214 provided in the hardened executable object code 216. The example implicit bounds driver 236 can be provided in an OS installation package, an OS update, and/or in an installation package of the hardened executable object code 216. In the illustrated example, during runtime, the implicit bounds driver 236 obtains the implicit GBPs 230 from the hardened executable object code 216 and stores the implicit GBPs 230 in a global bounds table 238. In this manner, the implicit bound checks 214 can be performed during execution of the hardened executable object code 216 to check memory accesses against the buffer bounds in the global bounds table 238 to ensure that none of the memory accesses results in a buffer overflow or underflow that would result in an unauthorized access to a protected SIR memory space (e.g., the SMRAM 224). In the illustrated example, the global bounds table 238 can be implemented using an MPX bounds table as described below in connection with FIG. 3.

In some examples, the implicit GBP handler 206 provides means for defining an implicit bound pointer (e.g., an implicit GBP 230) based on an implicit bound pointer definition (e.g., an implicit GBP definition 218) in a configuration file (e.g., a module configuration meta file 220) for a memory region and/or provides means for instrumenting object code (e.g., the object code 212) with an implicit buffer bound check (e.g., an implicit buffer bound check 214) based on the implicit bound pointer. In some examples, the compiler 202 provides means for generating hardened executable object code (e.g., the hardened executable object code 216) based on the object code, the implicit buffer bound check, and the implicit bound pointer.

Figure 3:
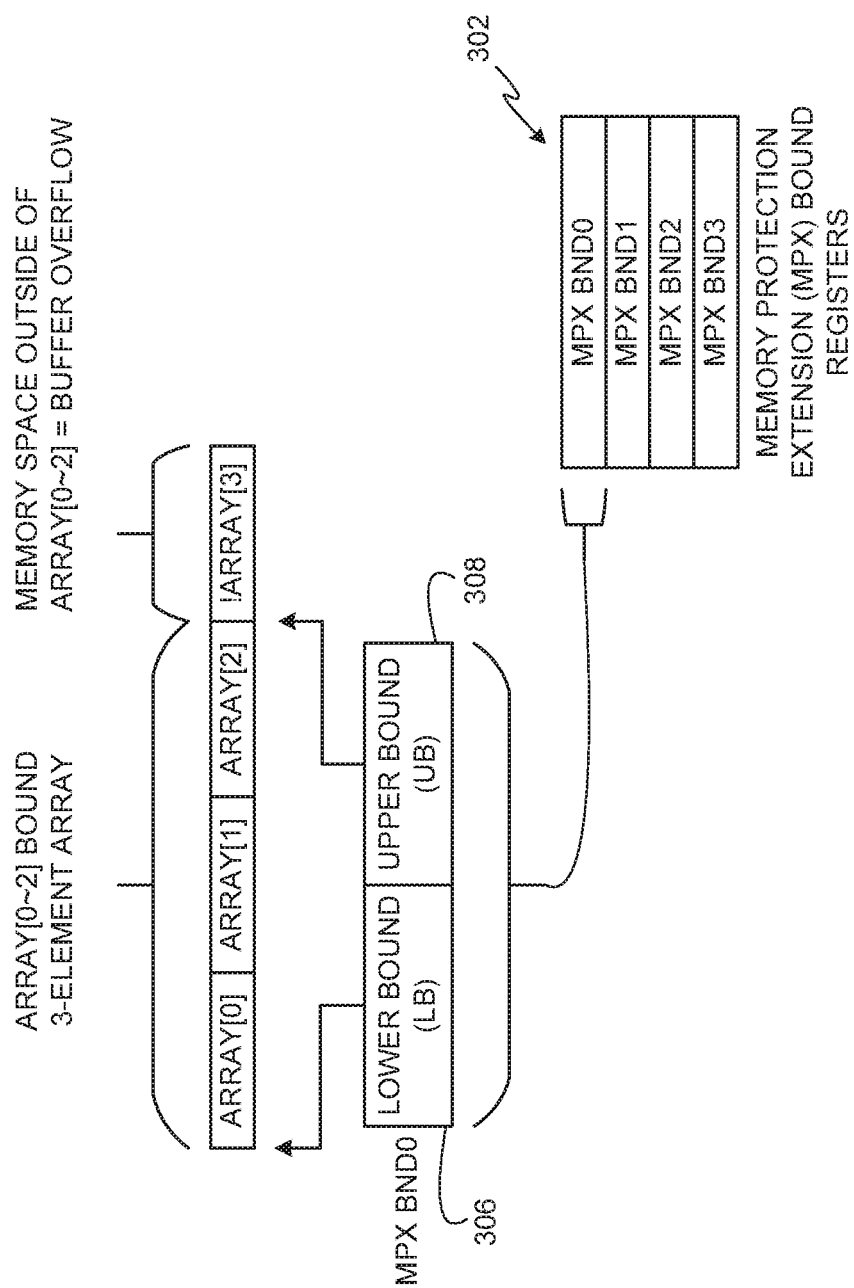
FIG. 3 depicts memory protection extension (MPX) bound registers, and a memory array that may be protected in accordance with the teachings of this disclosure using a lower bound and an upper bound of the memory array specified in one of the MPX bound registers.

FIG. 3 depicts example MPX bound registers 302, and a memory array 304 protected by a lower bound 306 and an upper bound 308 specified in a first one of the MPX bound registers (e.g., MPX BND0 register). The MPX bound registers 302 of the illustrated example form an MPX bounds table that may be used to implement the global bounds table 238 of FIG. 2. In the illustrated example, each MPX bound register 302 defines a lower bound and an upper bound of in SIR protected memory space. In the illustrated example, the lower bound 306 defines a lower buffer bound of array[0~2], and the example upper bound 308 defines an upper buffer bound of array[0~2]. Examples disclosed herein can use the lower bounds 306 and the upper bounds 308 specified in the MPX bound registers 302 to perform the implicit bound checks 214 (FIG. 2) to prevent memory accesses from creating buffer underflows and/or overflows violating the lower bounds 306 and the upper bounds 308 that would result in reading and/or writing data corresponding to SIR protected memory spaces (e.g., the array[0~2]).

FIG. 4 is example pseudocode 400 representative of machine readable instructions that include a stack-based implicit global bounds check (e.g., an implicit bounds check 214 of FIG. 2 for stack memory) created by the example apparatus 200 of FIG. 2 using a compiler optimization process in accordance with the teachings of this disclosure. Although the pseudocode 400 of the illustrated example is shown in human readable language to facilitate its explanation, it should be understood that the pseudocode 400 represents compiled object code. In particular, the pseudocode 400 is an example of the hardened executable object code 216 of FIG. 2. The pseudocode 400 of the illustrated example includes a main program 402 that includes unmodified code portions 404 corresponding to the object code 212 (FIG. 2), which the compiler 202 generates by compiling the unmodified source code 210 (FIG. 2). In addition, the main program 402 includes implicit bound memory protection portions 406 that the implicit GBP handler 206 (FIG. 2) inserts into the object code 212 during a compiler optimization process to create the hardened executable object code 216. The implicit bound memory protection portions 406 are used during the runtime phase 234 (FIG. 2) to verify that memory accesses in the main program 402 do not violate implicit bounds of protected memory regions in stack memory.

In the illustrated example, the implicit GBP handler 206 analyzes the unmodified code portions 404 to determine whether to insert an implicit bounds check 214. In the example of FIG. 4, the implicit GBP handler 206 determines that an implicit bounds check 214 should be created due to the defined array (e.g., array[3]). To create the implicit bounds check 214 in the illustrated example, the parser 208 parses the implicit GBP definitions 218 from the module configuration meta files 220 of FIG. 2 to obtain an implicit GBP definition 218 that corresponds to a SIR memory space in which memory is to be allocated for the array[3] during runtime. The parser 208 provides the corresponding implicit GBP definition 218 to the implicit GBP handler 206. The implicit GBP handler 206 then uses the implicit GBP definition 218 to create an example implicit GBP definition instruction 408 to define an implicit GBP 230 (FIG. 2). In the illustrated example, the implicit GBP definition instruction 408 is shown as "SMRAMBoundPointerAddress=PcdGetPtr(SMRAM-BoundPointerAddress)." In the illustrated example, the implicit GBP 230 is represented by the variable name SMRAMBoundPointerAddress, which is a pointer address to the buffer bounds for the SMRAM memory space 224 of FIG. 2.

The example implicit GBP handler 206 then inserts an example bounds table load instruction 410 shown in FIG. 4 as "_UEFI_load_bounds (BND0, SMRAMBoundPointerAddress)." In this manner, during runtime, the example bounds table load instruction 410 causes the example implicit bounds driver 236 (FIG. 2) to load or store the implicit GBP 230 at the runtime phase 234 (FIG. 2) in the example global bounds table 238 (FIG. 2). The bounds table load instruction 410 of the illustrated example is a UEFI instruction that operates at the firmware level to store the implicit GBP 230 in, for example, bound register MPX BND0 of the MPX bound registers 302 of FIG. 3. In this manner, the implicit GBP 230 represented by the variable name SMRAMBoundPointerAddress defines the lower bound 306 and the upper bound 308 of FIG. 3 corresponding to the array in the SMRAM memory space 224.

Also in the illustrated example of FIG. 4, the implicit GBP handler 206 inserts a lower implicit bound check 412 and an upper implicit bound check 414. The lower implicit bound check 412 and the upper implicit bound check 414 of the illustrated example of FIG. 4 implement ones of the implicit bound checks 214 of FIG. 2 to be executed during the runtime phase 234 to verify that memory accesses (e.g., pointer-based memory accesses) in the main program 402 do not violate implicit bounds of protected memory. In the illustrated example, the lower implicit bound check 412 is represented by the instruction "_chk_lbounds (Bnd0, &ptr2 [3])," and the upper implicit bound check 414 is represented by the instruction "_chk_ubounds (Bnd0, &ptr2[3]+sizeof (int)−1)." The example lower implicit bound check 412 checks the memory access for the pointer reference "&ptr2 [3]" against a lower bound 306 (FIG. 3) defined in the bound register MPX BND0 of the MPX bound registers 302 (FIG. 3). The example upper implicit bound check 414 checks the memory access for the pointer reference "&ptr2[3]+sizeof (int)−1" against an upper bound 308 (FIG. 3) defined in the bound register MPX BND0 of the MPX bound registers 302 (FIG. 3).

Thus, as shown in the illustrated example of FIG. 4, the implicit GBP handler 206 instruments the main program 402 with the implicit GBP definition instruction 408 and the example bounds table load instruction 410 during an initialization portion of the main program 402 to first define the implicit buffer bounds (e.g., an implicit GBP 230 of FIG. 2) during the runtime phase 234 (FIG. 2). The example implicit GBP handler 206 instruments the main program 402 with the lower implicit bound check 412 and the upper implicit bound check 414 after the implicit buffer bounds are defined (e.g., via the implicit GBP definition instruction 408 and the example bounds table load instruction 410). In this manner, the lower implicit bound check 412 and the upper implicit bound check 414 perform implicit bound checks 214 (FIG. 2) of a pointer reference memory access against the implicit buffer bounds (e.g., an implicit GBP 230) before exiting/returning from the main program 402 during the runtime phase 234 to verify that the implicit buffer bounds are not violated.

FIG. 5 is example pseudocode 500 representative of machine readable instructions that include a stack-based implicit global bounds check (e.g., an implicit bounds check 214 of FIG. 2 for stack memory) created by the example apparatus 200 of FIG. 2 using a compiler optimization process during a compilation phase in accordance with the teachings of this disclosure after a compiler optimization process creates an explicit global bound check. Although the pseudocode 500 of the illustrated example is shown in human-readable language to facilitate its explanation, it should be understood that the pseudocode 500 represents compiled object code. In particular, the pseudocode 500 is an example of the hardened executable object code 216 of FIG. 2. The pseudocode 500 of the illustrated example includes the main program 402 of FIG. 4 that includes the unmodified code portions 404 corresponding to the object code 212 (FIG. 2). In addition, the example main program 402 includes the implicit bound memory protection portions 406 that the implicit GBP handler 206 (FIG. 2) inserts into the object code 212 during a compiler optimization phase to create the hardened executable object code 216. However, unlike FIG. 4, the pseudocode 500 of FIG. 5 also includes explicit bound memory protection portions 502 that are inserted into the main program 402 by the explicit bounds handler 204 using prior memory protection features based on explicit buffer bounds (e.g., Intel® MPX memory protection features) to check memory accesses against explicit buffer bounds to prevent buffer overflows and/or underflows. The explicit bound memory protection portions 502 are used during the runtime phase 234 (FIG. 2) to verify that memory accesses in the main program 402 do not violate explicit bounds of protected memory regions. Thus, as shown in the pseudocode 500 of FIG. 5, the apparatus 200 of FIG. 2 can be used to create the implicit bound memory protection portions 406 during an additional compiler optimization pass after the explicit bounds handler 204 performs a compiler optimization pass based on explicit buffer bounds.

FIG. 6 is example pseudocode 600 representative of machine readable instructions that include a heap-based implicit global bounds check (e.g., an implicit bounds check 214 of FIG. 2 for heap memory) created by the example apparatus 200 of FIG. 2 using a compiler optimization process in accordance with the teachings of this disclosure. Although the pseudocode 600 of the illustrated example is shown in human readable language to facilitate its explanation, it should be understood that the pseudocode 600 represents compiled object code. In particular, the pseudocode 600 is an example of the hardened executable object code 216 of FIG. 2. The pseudocode 600 of the illustrated example includes a main program 602 that includes unmodified code portions 604 corresponding to the object code 212 (FIG. 2), which the compiler 202 generates by compiling the unmodified source code 210 (FIG. 2). In addition, the main program 602 includes implicit bound memory protection portions 606 that the implicit GBP handler 206 (FIG. 2) inserts into the object code 212 during a compiler optimization process to create the hardened executable object code 216. The implicit bound memory protection portions 606 are used during the runtime phase 234 (FIG. 2) to verify that memory accesses in the main program 602 do not violate implicit bounds of protected memory regions in heap memory.

In the illustrated example, the implicit GBP handler 206 analyzes the unmodified code portions 604 to determine whether to insert an implicit bounds check 214. In the example of FIG. 6, the implicit GBP handler 206 determines that an implicit bounds check 214 should be created due to the memory allocation in heap memory based on the malloc( ) function call 607 (e.g., ptr1=malloc(sizeof(int)*3)). To create the implicit bounds check 214 in the illustrated example, the parser 208 (FIG. 2) accesses the implicit GBP definitions 218 in a module configuration meta file 220 of FIG. 2, parses the implicit GBP definitions 218 to obtain an implicit GBP definition 218 that corresponds to a SIR memory space in which memory is to be allocated for the malloc( ) function call 607, and provides the corresponding implicit GBP definition 218 to the implicit GBP handler 206. The implicit GBP handler 206 uses the implicit GBP definitions 218 to create an example implicit GBP definition instruction 608 to define an implicit GBP 230 (FIG. 2). In the illustrated example, the implicit GBP definition instruction 608 is shown as "SMRAMBoundPointerAddress=PcdGetPtr(SMRAM-BoundPointerAddress)." In the illustrated example, the implicit GBP 230 is represented by the variable name SMRAMBoundPointerAddress, which is a pointer address to the buffer bounds for the SMRAM memory space 224 of FIG. 2.

The example implicit GBP handler 206 inserts an example bounds table load instruction 610 shown in FIG. 6 as "_UEFI_load_bounds (BND0, SMRAMBoundPointerAddress)." The example bounds table load instruction 610 causes the implicit bound driver 236 (FIG. 2) to load or store the implicit GBP 230 at the runtime phase 234 (FIG. 2) in the example global bounds table 238 (FIG. 2). The bounds table load instruction 610 of the illustrated example is a UEFI instruction that operates at the firmware level to store the implicit GBP 230 in, for example, bound register MPX BND0 of the MPX bound registers 302 of FIG. 3. In this manner, the implicit GBP 230 represented by the variable name SMRAMBoundPointerAddress defines the lower bound 306 and the upper bound 308 of FIG. 3 corresponding to the array in the SMRAM memory space 224.

Also in the illustrated example of FIG. 6, the implicit GBP handler 206 inserts a lower implicit bound check 612 and an upper implicit bound check 614. The lower implicit bound check 612 and the upper implicit bound check 614 of the illustrated example of FIG. 6 implement ones of the implicit bound checks 214 to be executed during the runtime phase 234 to verify that memory accesses in the main program 602 do not violate implicit bounds of protected memory. In the illustrated example, the lower implicit bound check 612 is represented by the instruction "_chk_lbounds (Bnd0, &ptr2 [3])," and the upper implicit bound check 614 is represented by the instruction "_chk_ubounds (Bnd0, &ptr2[3]+sizeof (int)−1)." The example lower implicit bound check 612 checks the memory access for the pointer reference "&ptr2 [3]" against a lower bound 306 (FIG. 3) defined in the bound register MPX BND0 of the MPX bound registers 302 (FIG. 3). The example upper implicit bound check 614 checks the memory access for the pointer reference "&ptr2[3]+sizeof (int)−1" against an upper bound 308 (FIG. 3) defined in the bound register MPX BND0 of the MPX bound registers 302 (FIG. 3).

Thus, as shown in the illustrated example of FIG. 6, the implicit GBP handler 206 instruments the main program 602 with the implicit GBP definition instruction 608 and the example bounds table load instruction 610 during an initialization portion of the main program 602 to first define the implicit buffer bounds (e.g., an implicit GBP 230 of FIG. 2) during the runtime phase 234 (FIG. 2). The example implicit GBP handler 206 instruments the main program 602 with the lower implicit bound check 612 and the upper implicit bound check 614 after the implicit buffer bounds are defined (e.g., via the implicit GBP definition instruction 608 and the example bounds table load instruction 610). In this manner, the lower implicit bound check 612 and the upper implicit bound check 614 perform implicit bound checks 214 (FIG. 2) of a pointer reference memory access against the implicit buffer bounds (e.g., an implicit GBP 230) before exiting/returning from the main program 402 during the runtime phase 234 to verify that the implicit buffer bounds are not violated.

FIG. 7 is example pseudocode 700 representative of machine readable instructions that include a heap-based implicit global bounds check (e.g., an implicit bounds check 214 of FIG. 2 for heap memory) created by the example apparatus 200 of FIG. 2 using a compiler optimization process during a compilation phase in accordance with the teachings of this disclosure after a compiler optimization process creates an explicit global bound check. Although the pseudocode 700 of the illustrated example is shown in human-readable language to facilitate its explanation, it should be understood that the pseudocode 700 represents compiled object code. In particular, the pseudocode 700 is an example of the hardened executable object code 216 of FIG. 2. The pseudocode 700 of the illustrated example includes the main program 602 of FIG. 6 that includes the unmodified code portions 604 corresponding to the object code 212 (FIG. 2). In addition, the example main program 602 includes the implicit bound memory protection portions 606 that the implicit GBP handler 206 (FIG. 2) inserts into the object code 212 during a compiler optimization phase to create the hardened executable object code 216. However, unlike FIG. 6, the pseudocode 700 of FIG. 7 also includes explicit bound memory protection portions 702. The explicit bound memory protection portions 702 are used during the runtime phase 234 (FIG. 2) to verify that memory accesses in the main program 602 do not violate explicit bounds of protected memory regions. In the illustrated example, the explicit bounds handler 204 (FIG. 2) creates the explicit bound memory protection portions 702 using prior techniques such as prior memory protection features based on explicit buffer bounds (e.g., Intel® MPX memory protection features) to check memory accesses against explicit buffer bounds to prevent buffer overflows and/or underflows. For example, the explicit bounds handler 204 replaces the malloc( ) function call 607 shown in FIG. 6 with an MPX-_wrapper_malloc( ) function call 704 (e.g., ptr1=_mpx_wrapper_malloc(sizeof(int)*3)) and inserts an explicit bound memory protection portion 702 into the subroutine of the _mpx_wrapper_malloc( ) function call 704. In addition, the explicit bounds handler 204 inserts an explicit bound memory protection portion 702 into the main program 602. Thus, as shown in the pseudocode 700 of FIG. 7, the implicit GBP handler 206 of FIG. 2 can be used to create the implicit bound memory protection portions 606 during an additional compiler optimization pass after the explicit bounds handler 204 performs a compiler optimization pass based on explicit buffer bounds.

While an example manner of implementing the apparatus 200 of FIG. 2 is illustrated in FIG. 2, one or more of the elements, processes and/or devices illustrated in FIG. 2 may be combined, divided, re-arranged, omitted, eliminated and/or implemented in any other way. Further, the example compiler 202, the example explicit bounds handler 204, the example implicit GBP handler 206, the example parser 208 and/or, more generally, the example apparatus 200 of FIG. 2 may be implemented by hardware, software, firmware and/or any combination of hardware, software and/or firmware. Thus, for example, any of the example compiler 202, the example explicit bounds handler 204, the example implicit GBP handler 206, the example parser 208 and/or, more generally, the example apparatus 200 could be implemented by one or more analog or digital circuit(s), logic circuits, programmable processor(s), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example compiler 202, the example explicit bounds handler 204, the example implicit GBP handler 206, and/or the example parser 208 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 200 of FIG. 2 may include one or more elements, processes and/or devices in addition to, or instead of, those illustrated in FIG. 2, and/or may include more than one of any or all the illustrated elements, processes and devices.

Figure 8:
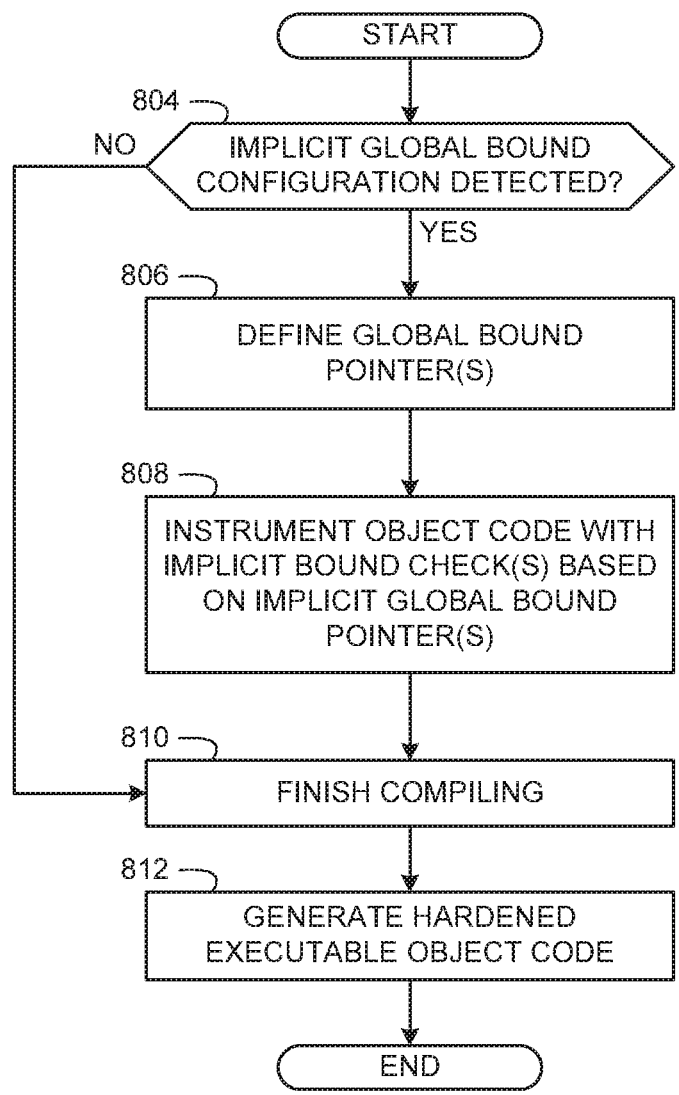
FIG. 8 is a flow diagram representative of example machine readable instructions that may be executed to implement the example apparatus of FIG. 2 to instrument object code with implicit bound checks to protect memory from buffer overflow and/or underflow conditions.
Figure 9:
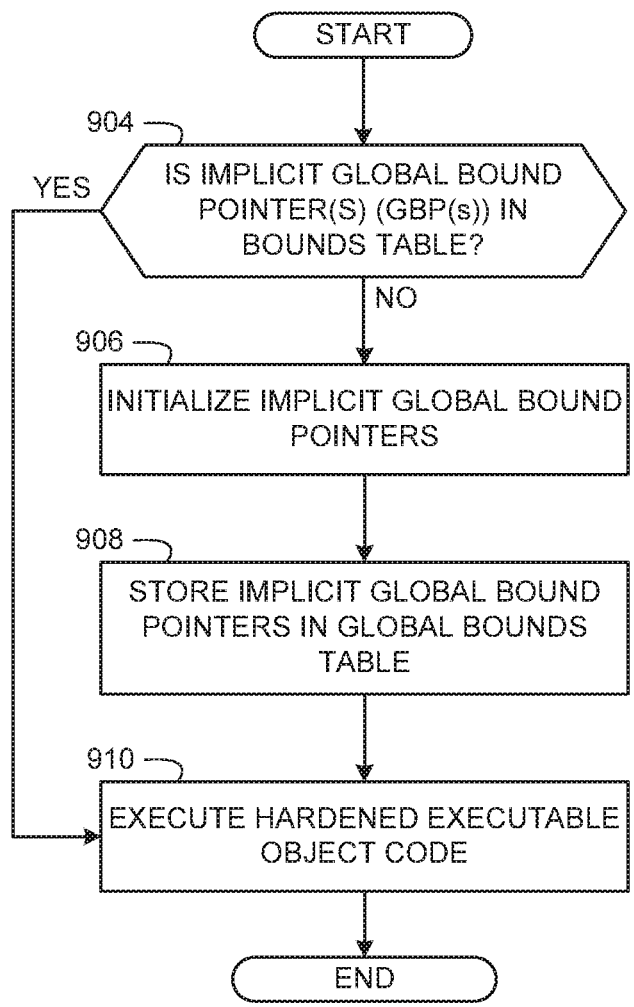
FIG. 9 is a flow diagram representative of example machine readable instructions that may be executed during a runtime phase to define implicit bound pointers for use in performing implicit bound checks at runtime during execution of hardened executable object code to protect memory from buffer overflow and/or underflow conditions.

A flowchart representative of example machine readable instructions for implementing the apparatus 200 of FIG. 2 is shown in FIG. 8. A flowchart representative of example machine readable instructions to define implicit bound pointers for performing implicit bound checks created in accordance with the teachings of this disclosure during a runtime phase (e.g., the runtime phase 234 of FIG. 2) is shown in FIG. 9. In these examples, the machine readable instructions comprise programs for execution by a processor such as the processor 1012 shown in the example processor platform 1000 discussed below in connection with FIG. 10. The programs may be embodied in software stored on one or more tangible computer readable storage media such as a CD-ROM, a floppy disk, a hard drive, a digital versatile disk (DVD), a Blu-ray disk, or a memory associated with the processor 1012, but the entirety of the programs and/or parts thereof could alternatively be executed by a device other than the processor 1012 and/or embodied in firmware or dedicated hardware. Further, although the example programs are described with reference to the flowcharts illustrated in FIGS. 8 and 9, many other methods of implementing the example apparatus 200 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer and/or machine readable instructions) stored on one or more tangible computer readable storage media such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 8 is a flow diagram representative of example computer readable instructions that may be executed to implement the example apparatus 200 of FIG. 2 to instrument the object code 212 (FIG. 2) with implicit bound checks to protect stack and/or heap memory (e.g., the SMRAM 224 of FIG. 2) from buffer overflow and/or underflow conditions. In some examples, the apparatus 200 creates implicit bound checks 214 for only stack memory to generate the hardened executable object code 216 of FIG. 2. In other examples, the apparatus 200 creates implicit bound checks 214 for only heap memory to generate the hardened executable object code 216. In yet other examples, the apparatus 200 creates implicit bound checks 214 for both stack and heap memory to generate the hardened executable object code that includes both stack implicit bound checks and heap implicit bound checks.

The example program of FIG. 8 begins at block 804 at which the implicit GBP handler 206 (FIG. 2) determines whether an implicit global bound configuration is detected. In the illustrated example, the presence of an implicit global bound configuration (e.g., provided by a developer) is indicative that the apparatus 200 should perform one or more optimization passes to instrument the object code 212 with one or more implicit bound check(s) 214 (FIG. 2). In the illustrated example, to determine whether such an implicit global bound configuration is present, the implicit GBP handler 206 determines whether the implicit GBP definition(s) 218 are provided in the module configuration meta file(s) 220 of FIG. 2. If an implicit global bound configuration is not detected at block 804, control passes to block 810 described below.

If the implicit GBP handler 206 detects an implicit global bound configuration at block 804, the implicit GBP handler 206 defines one or more implicit GBPs 230 (FIG. 2) (block 806). For example, the implicit GBP handler 206 defines the implicit GBP(s) 230 based on the implicit GBP definition(s) 218 provided by the parser 208 (FIG. 2) from the module configuration meta file(s) 220. The implicit GBP handler 206 instruments the object code 212 with one or more implicit bound check(s) 214 based on one or more implicit GBP(s) 230 (block 808). For example, the implicit GBP handler 206 creates one or more of the implicit bound check(s) 214 for stack memory and instruments the object code 212 with the implicit bound check(s) 214 by inserting the implicit bound memory protection portions 406 in the object code 212 as described above in connection with FIG. 4 and/or FIG. 5. Additionally or alternatively, the implicit GBP handler 206 creates one or more of the implicit bound check(s) 214 for heap memory and instruments the object code 212 with the implicit bound check(s) 214 by inserting the implicit bound memory protection portions 606 in the object code 212 as described above in connection with FIG. 6 and/or FIG. 7.

The compiler 202 finishes compiling the object code 212 (block 810). For example, the compiler 202 may finish any other optimization passes during compilation and complete the compilation process. When the compilation is complete, the hardened executable object code 216 is generated (block 812). For example, when the implicit global bound configuration is detected at block 804, the apparatus 200 generates the hardened executable object code 216 which, as shown in FIG. 2, is a combination of the object code 212, the implicit bound check(s) 214, and the implicit GBP(s) 230. In some examples, the hardened executable object code 216 also includes explicit bound checks as shown in FIGS. 5 and 7. In examples in which the implicit global bound configuration is not detected at block 804, the hardened executable object code 216 generated at block 812 does not include implicit bound checks 214 instrumented in accordance with the teachings of this disclosure. The example process of FIG. 8 then ends.

FIG. 9 is a flow diagram representative of example computer readable instructions that may be executed during a runtime phase to define implicit bound pointers for use in performing implicit bound checks at runtime during execution of the hardened executable object code 216 of FIG. 2 to protect memory from buffer overflow and/or underflow conditions. The example program of FIG. 9 begins at block 904 at which the implicit bounds driver 236 (FIG. 2) determines whether one or more implicit GBP(s) 230 (FIG. 2) are located in the global bounds table 238 (FIG. 2). For example, the implicit bounds driver 236 may determine whether it has previously stored one or more implicit GBP(s) 230 of the hardened executable object code 216 in the global bounds table 238. That is, if the hardened executable object code 216 has been previously initialized for execution, the implicit bounds driver 236 has previously loaded the one or more implicit GBP(s) 230 in the global bounds table 238. If the implicit bounds driver 236 determines at block 904 that the one or more implicit GBP(s) 230 are stored in the global bounds table 238, control passes to block 910 at which a processor (e.g., the processor 1012 of FIG. 10) executes the hardened executable object code 216.

If the implicit bounds driver 236 determines at block 904 that the one or more implicit GBP(s) 230 are not yet stored in the global bounds table 238, the implicit bounds driver 236 initializes the one or more implicit GBP(s) 230 (block 906). For example, the implicit bounds driver 236 initializes the one or more implicit GBP(s) 230 from the hardened executable object code 216 using a UEFI PCD application programming interface (API).

The implicit bounds driver 236 stores the one or more implicit GBP(s) 230 in the global bounds table 238 (block 908). For example, by storing the one or more implicit GBP(s) 230 in the global bounds table 238, the one or more implicit GBPs 230 become associated with corresponding ones of the implicit bound check(s) 214 in the hardened executable object code 216. A processor (e.g., the processor 1012 of FIG. 10) executes the hardened executable object code 216 (block 910). The example process of FIG. 9 ends.

In some examples corresponding to the process of FIG. 9, if for any reason the implicit bounds driver 236 cannot access or initialize the one or more implicit GBP(s) 230 from the hardened executable object code 216, the global bounds table 238 is loaded with INIT values (e.g., by instructions such as the example bounds table load instruction 410 of FIG. 4 and/or the example bounds table load instruction 610 of FIG. 6) for the corresponding ones of the implicit GBP(s) 230. The INIT values cause both lower and upper bounds of corresponding buffers to be set to zero. In such examples that employ the INIT values, bound checks for corresponding buffers (e.g., the SMRAM 224 of FIG. 2) are disabled, and all memory accesses to such buffers are allowed. An example reason for why the implicit bounds driver 236 would not be able to access or initialize the one or more implicit GBP(s) 230 from the hardened executable object code 216 is that the hardened executable object code 216 is running on a processor that lacks the hardware features (e.g., Intel® MPX memory protection features) to support executing the instrumented implicit bound checks.

Examples disclosed herein can enable additional security features. For example, processors equipped with Intel® MPX memory protection features can be designed to include a read-only machine specific register (MSR) for use with examples disclosed herein as an additional security feature. In some examples, MSRs are provided in processors to control and report on processor performance. For example, MSRs handle system-related functions and are typically not accessible to application programs. For example, the read-only MSR can report "MPX is active on the CPU AND it was actively employed while in the TEE" (e.g., a Trusted Execution Environment (TEE) having a bit map for System Management Mode (SMM), Intel® Software Guard Extensions (SGX), a virtual machine monitor (VMM), and/or any other occluded software environment). This will notify security assessment software that a running process is employing bound checks instrumented in accordance with the teachings of this disclosure and can add this information to a security reporting posture. For example, a security reporting posture can be implemented for SMM using a Hardware Security Testability Interface (HSTI) and/or can be implemented using a bit in a Windows SMM Security Mitigations Table (WSMT) ACPI table. Using such security reporting postures, software can elect to not launch in the absence of memory protections implemented in accordance with the teachings of this disclosure.

Figure 10:
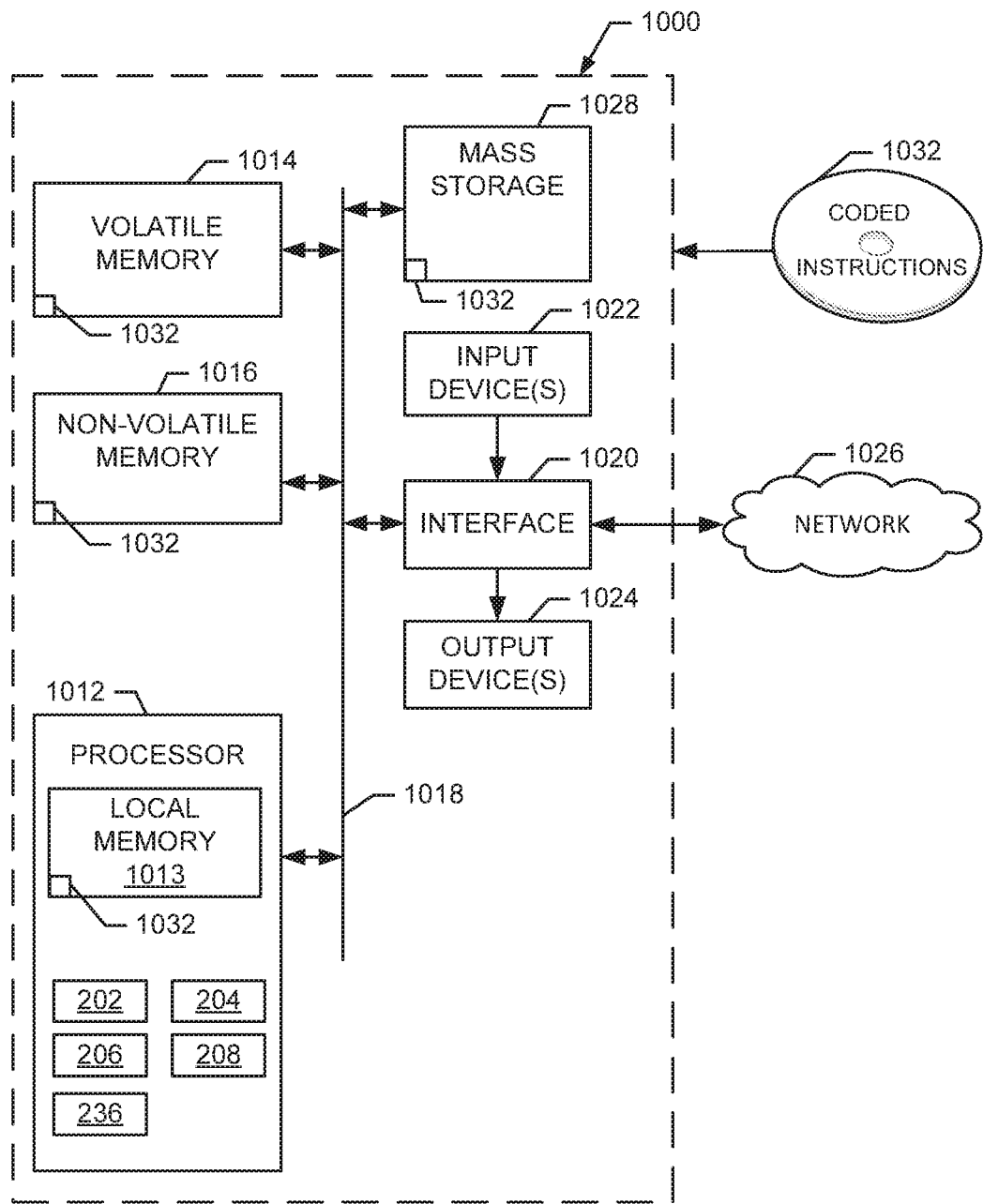
FIG. 10 is an example processor platform capable of executing the example machine readable instructions represented by FIG. 8 and/or FIG. 9 to implement the example apparatus of FIG. 2 and/or to execute machine readable instructions represented by the example pseudocode of FIGS. 4-7 to protect memory from buffer overflow and/or underflow conditions.

FIG. 10 is a block diagram of an example processor platform 1000 capable of executing the instructions of FIG. 8 to implement the apparatus 200 of FIG. 2. The example processor platform 1000 is also capable of executing the instructions of FIG. 9 to implement the implicit bounds driver 236 of FIG. 2 during the runtime phase 234 to execute the hardened executable object code 216. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. In the illustrated example, the processor 1012 implements one or more of the compiler 202, the explicit bounds handler 204, the implicit GBP handler 206, the parser 208, and/or the implicit bounds driver 236 of FIG. 2.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller. The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 representative of the computer readable instructions of FIGS. 8 and 9 may be stored in the mass storage device 1028, in the volatile memory 1014, in the non-volatile memory 1016, and/or on a removable tangible computer readable storage medium such as a CD or DVD.

Examples disclosed herein are useful to instrument legacy software and/or firmware code with implicit memory checks that protect memory from buffer overflow and/or underflow conditions without requiring developers to refactor the legacy software and/or firmware code. That is, prior solutions to implement implicit memory bound checks to prevent read/write violations require non-trivial efforts from developers to refactor legacy code. This often involves a strict code review process, manually adding code to track all memory accesses for implicit memory bound checking (e.g., similar to a code analysis by a profiler), and frequently changing page table access rights on the fly for different modules. Such prior solutions have a number of limitations. For example, prior solutions have significant overhead to manually add memory check code or to frequently change/restore page table access, which can adversely impact execution performance and code size. Because pointer-based memory accesses are in many places in software/firmware code, fine-grain checking and updating code require many changes to the original C-language source code. However, such changes to source code apply to test phases but do not necessarily meet performance requirements of release executable binary object code without significant work (e.g., debugging) during compilation. In addition, such prior solutions can also result in incomplete updates to code. For example, manually adding extra code to add bound checks is susceptible to human error resulting on possibly not addressing every memory access. Thus, it cannot be guaranteed that all code paths of firmware/software are successfully covered. In addition, such prior solutions can result in inconsistent, ad-hoc approaches to implementing memory bound checks. For example, different program modules may use different memory bounds (e.g., SMRAM, Advanced Configuration and Power Interface (ACPI) Runtime Buffer, etc.) that are addressed differently by different developers. In addition, implementing such prior solutions can be difficult to enforce. For example, developers may be unwilling or unable to add memory bound checks or perform memory access safety tests in real production developments.

Examples disclosed herein overcome the above drawbacks of prior solutions by not requiring developers to refactor legacy software/firmware code. Instead, legacy software/firmware code can be instrumented automatically with implicit bound checks during a compilation process in a manner that is consistent across all code modules of a program for applying in release production code and in a way that can detect all memory accesses needing implicit bound checks. In addition, using examples disclosed herein in combination with Intel® MPX memory protection features including Intel® MPX registers and instructions, efficient hardware-based implicit memory bound checks can be implemented with lower overhead for both performance and code size than prior solutions. Examples disclosed herein can be adopted directly in higher priority module release binaries. In such MPX implementations, when Intel® MPX memory protection features are not enabled or not present in a processor during runtime, Intel® MPX-based implicit bound checks in executable object code are processed as NOPs so that the executable object code can run normally (even if without implicit bound memory checks).

Examples disclosed herein use GBPs which are globally available to all functions and subroutines at the module level by default. As such, examples disclosed herein implement implicit bound checks without needing to trace pointer movement or bound propagation across a number of variable assignments in code modules. That is, when explicit pointers are defined in code, they are pointers to different parts of memory. Thus, different explicit bounds need to be traced to ensure that a bounds check knows which memory buffer it is checking. For example, some prior art techniques insert buffer bound check code into object code after each pointer movement or bound propagation (e.g., each time pointer is involved in an operation in code). This significantly increases code size. In examples disclosed herein, tracing of pointer movement or bound propagation is not necessary because implicit bounds are defined as global bound pointers available to all functions and subroutines. As such, the global bounds are always available in a global table and can be accessed at any point in execution without needing to trace them in memory. As shown in the example pseudocode of FIGS. 4-7 implemented in accordance with teachings of this disclosure, numerous code modifications each time a pointer is involved in an operation are not necessary to trace pointer movement or bound propagation. As such, examples disclosed herein have less overhead than prior memory protection techniques for general instrumentation of bound checks.

In addition, use of UEFI firmware in connection with examples disclosed herein can be adapted for use with Intel® MPX memory protection features without significantly decreasing boot performance. That is, Intel® MPX performance features mainly add CPU overhead. However, because UEFI firmware is not CPU intensive, using the Intel® MPX performance features with UEFI firmware does not significantly decrease boot performance based on CPU overhead. In addition, the Intel® MPX memory protection features consume more memory for the global bound table 238 (FIG. 2). However, UEFI firmware is not memory-intensive. As such, UEFI firmware typically leaves sufficient system memory for use by Intel® MPX memory protection features. In addition, in some examples, UEFI firmware exhibits better performance with smaller code size. Using hardware features in CPUs that enable the Intel® MPX memory protections can result in smaller code size for hardened executable object code having instrumented memory checks than code size of hardened executable object code generated using prior techniques.

The following pertain to further examples disclosed herein.

Example 1 is a method to protect memory from buffer overflow or underflow. The method of Example 1 includes defining, by executing an instruction with at least one processor, an implicit bound pointer based on an implicit bound pointer definition in a configuration file for a memory region; instrumenting, by executing an instruction with the at least one processor, object code with an implicit buffer bound check based on the implicit bound pointer; and generating, by executing an instruction with the at least one processor, hardened executable object code based on the object code, the implicit buffer bound check, and the implicit bound pointer, the implicit bound pointer located in the hardened executable object code during a compilation phase to facilitate loading the implicit bound pointer in a global bounds table during runtime for use with the implicit buffer bound check.

In Example 2, the subject matter of Example 1 can optionally include that the configuration file is implemented using a platform configuration database entry.

In Example 3, the subject matter of any one of Examples 1-2 can optionally include that the platform configuration database entry is to configure a subsystem of a computer in association with execution of a platform basic input-output system (BIOS) or a unified extensible firmware interface.

In Example 4, the subject matter of any one of Examples 1-3 can optionally include that the platform configuration database entry is configured in a unified extensible firmware interface, the unified extensible firmware interface including a boot loader to load an operating system in a computer.

In Example 5, the subject matter of any one of Examples 1-4 can optionally include that the global bounds table is a memory protection extension (MPX) table.

In Example 6, the subject matter of any one of Examples 1-5 can optionally include that the memory region is a system memory random access memory.

In Example 7, the subject matter of any one of Examples 1-6 can optionally include that, before the instrumenting of the object code with the implicit buffer bound check, the object code includes an explicit bound check.

Example 8 is an apparatus to protect memory from buffer overflow or underflow. The apparatus of Example 8 includes an implicit global bound pointer handler to: define an implicit bound pointer based on an implicit bound pointer definition in a configuration file for a memory region; and instrument object code with an implicit buffer bound check based on the implicit bound pointer; and a compiler to generate hardened executable object code based on the object code, the implicit buffer bound check, and the implicit bound pointer, the implicit bound pointer located in the hardened executable object code during a compilation phase to facilitate loading the implicit bound pointer in a global bounds table during runtime, the implicit bound pointer in the global bounds table to be accessible to the implicit buffer bound check during execution of the hardened executable object code.

In Example 9, the subject matter of Example 8 can optionally include that the configuration file is implemented using a platform configuration database entry.

In Example 10, the subject matter of any one of Examples 8-9 can optionally include that the platform configuration database entry is to configure a subsystem of a computer in association with execution of a platform basic input-output system (BIOS) or a unified extensible firmware interface.

In Example 11, the subject matter of any one of Examples 8-10 can optionally include that the platform configuration database entry is configured in a unified extensible firmware interface, the unified extensible firmware interface including a boot loader to load an operating system in a computer.

In Example 12, the subject matter of any one of Examples 8-11 can optionally include the global bounds table is a memory protection extension (MPX) table.

In Example 13, the subject matter of any one of Examples 8-12 can optionally include that the memory region is a system memory random access memory, and at least one of the compiler or the implicit global bound pointer handler is implemented by at least one processor.

In Example 14, the subject matter of any one of Examples 8-13 can optionally include that, before the instrumenting of the object code with the implicit buffer bound check, the object code includes an explicit bound check.

Example 15 is a non-transitory machine readable storage medium comprising instructions that, when executed, cause at least one processor to define an implicit bound pointer based on an implicit bound pointer definition in a configuration file for a memory region; instrument object code with an implicit buffer bound check based on the implicit bound pointer; and generate hardened executable object code based on the object code, the implicit buffer bound check, and the implicit bound pointer, the implicit bound pointer located in the hardened executable object code during a compilation phase to facilitate loading the implicit bound pointer in a global bounds table during runtime for use with the implicit buffer bound check when executing the hardened executable object code.

In Example 16, the subject matter of Example 15 can optionally include that the configuration file is implemented using a platform configuration database entry.

In Example 17, the subject matter of any one of Examples 15-16 can optionally include that the platform configuration database entry is to configure a subsystem of a computer in association with execution of a platform basic input-output system (BIOS) or a unified extensible firmware interface.

In Example 18, the subject matter of any one of Examples 15-17 can optionally include that the platform configuration database entry is configured in a unified extensible firmware interface, the unified extensible firmware interface including a boot loader to load an operating system in a computer.

In Example 19, the subject matter of any one of Examples 15-18 can optionally include that the global bounds table is a memory protection extension (MPX) table.

In Example 20, the subject matter of any one of Examples 15-19 can optionally include that the memory region is a system memory random access memory.

In Example 21, the subject matter of any one of Examples 15-20 can optionally include that, before the instrumenting of the object code with the implicit buffer bound check, the object code includes an explicit bound check.

Example 22 is an apparatus to protect memory from buffer overflow or underflow. The apparatus of Example 22 includes means for defining an implicit bound pointer based on an implicit bound pointer definition in a configuration file for a memory region; means for instrumenting object code with an implicit buffer bound check based on the implicit bound pointer; and means for generating hardened executable object code based on the object code, the implicit buffer bound check, and the implicit bound pointer, the implicit bound pointer located in the hardened executable object code during a compilation phase to facilitate loading the implicit bound pointer in a global bounds table during runtime, the implicit bound pointer in the global bounds table to be accessible to the implicit buffer bound check during execution of the hardened executable object code.

In Example 23, the subject matter of Example 22 can optionally include that the configuration file is implemented using a platform configuration database entry.

In Example 24, the subject matter of any one of Examples 22-23 can optionally include that the platform configuration database entry is to configure a subsystem of a computer in association with execution of a platform basic input-output system (BIOS) or a unified extensible firmware interface.

In Example 25, the subject matter of any one of Examples 22-24 can optionally include that the platform configuration database entry is configured in a unified extensible firmware interface, the unified extensible firmware interface including a boot loader to load an operating system in a computer.

In Example 26, the subject matter of any one of Examples 22-25 can optionally include that the global bounds table is a memory protection extension (MPX) table.

In Example 27, the subject matter of any one of Examples 22-26 can optionally include that the memory region is a system memory random access memory.

In Example 28, the subject matter of any one of Examples 22-27 can optionally include that, before the instrumenting of the object code with the implicit buffer bound check, the object code includes an explicit bound check.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

This is a U.S. National Stage Patent Application under 35 U.S.C. 371 of PCT Patent Application No. PCT/CN2017/078865, filed Mar. 30, 2017, and entitled "Methods and Apparatus to Protect Memory From Buffer Overflow and/or Underflow." PCT Patent Application No. PCT/CN2017/078865 is hereby incorporated herein by reference in its entirety.

What is claimed is:

1. A method to protect memory from buffer overflow or underflow, the method comprising:
   accessing, by executing an instruction with at least one processor, a configuration file defining a bound pointer, the bound pointer corresponding to a hardware-defined buffer bound for a memory region, the buffer bound not to be explicitly allocated in a program;
   instrumenting, by executing an instruction with the at least one processor, object code with a buffer bound check based on the bound pointer; and
   generating, by executing an instruction with the at least one processor, hardened executable object code based on the object code, the buffer bound check, and the bound pointer, the bound pointer located in the hardened executable object code during a compilation phase.

2. The method as defined in claim 1, wherein the configuration file is implemented using a platform configuration database entry.

3. The method as defined in claim 2, wherein the platform configuration database entry is to configure a subsystem of a computer in association with execution of a platform basic input-output system (BIOS) or a unified extensible firmware interface.

4. The method as defined in claim 2, wherein the platform configuration database entry is configured in a unified extensible firmware interface, the unified extensible firmware interface including a boot loader to load an operating system in a computer.

5. The method as defined in claim 1, wherein the implicit bound pointer is loadable in a global bounds table during runtime, the global bounds table is a memory protection extension (MPX) table.

6. The method as defined in claim 1, wherein the memory region is a system memory random access memory.

7. The method as defined in claim 1, wherein, before the instrumenting of the object code with the implicit buffer bound check, the object code includes an explicit bound check.

8. An apparatus to protect memory from buffer overflow or underflow, the apparatus comprising:
   a global bound pointer handler to:
      access a configuration file defining a bound pointer, the bound pointer corresponds to a hardware-defined buffer bound for a memory region, the buffer bound not to be explicitly allocated in a program; and
      instrument object code with a buffer bound check based on the bound pointer; and
   a compiler to generate hardened executable object code based on the object code, the buffer bound check, and the bound pointer, the bound pointer located in the hardened executable object code during a compilation phase, at least one of the global bound pointer handler or the compiler includes circuitry.

9. The apparatus as defined in claim 8, wherein the configuration file is implemented using a platform configuration database entry.

10. The apparatus as defined in claim 9, wherein the platform configuration database entry is to configure a subsystem of a computer in association with execution of a platform basic input-output system (BIOS) or a unified extensible firmware interface.

11. The apparatus as defined in claim 9, wherein the platform configuration database entry is configured in a unified extensible firmware interface, the unified extensible firmware interface including a boot loader to load an operating system in a computer.

12. The apparatus as defined in claim 8, wherein the bound pointer is loadable in a global bounds table during runtime, the global bounds table is a memory protection extension (MPX) table.

13. The apparatus as defined in claim 8, wherein the memory region is a system memory random access memory, and the circuitry of the at least one of the global bound pointer handler or the compiler is implemented by at least one processor.

14. The apparatus as defined in claim 8, wherein the object code includes an explicit bound check before the global bound pointer handler instruments the object code with the buffer bound check.

15. A non-transitory machine readable storage medium comprising instructions that, when executed, cause at least one processor to at least:
   access a configuration file defining a bound pointer, the bound pointer corresponding to a hardware-defined buffer bound for a memory region, the buffer bound not to be explicitly allocated in a program;

instrument object code with a buffer bound check based on the bound pointer; and generate hardened executable object code based on the object code, the buffer bound check, and the bound pointer, the bound pointer located in the hardened executable object code during a compilation phase.

16. The non-transitory machine readable storage medium as defined in claim 15, wherein the instructions are to cause the at least one processor to access the configuration file as a platform configuration database entry.

17. The non-transitory machine readable storage medium as defined in claim 15, wherein the instructions are to cause the at least one processor to access the configuration file as a platform configuration database entry to configure a subsystem of a computer in association with execution of a platform basic input-output system (BIOS) or a boot loader.

18. The non-transitory machine readable storage medium as defined in claim 15, wherein the instructions are to cause the at least one processor to access the configuration file as a platform configuration database entry configured in a unified extensible firmware interface, the unified extensible firmware interface being a boot loader to load an operating system in a computer.

19. The non-transitory machine readable storage medium as defined in claim 15, wherein the instructions are to cause the at least one processor to generate the hardened executable object code by providing a load instruction, the load instruction to load the bound pointer in a global bounds table during runtime, the global bounds table is a memory protection extension (MPX) table.

20. The non-transitory machine readable storage medium as defined in claim 15, wherein the instructions are to cause the at least one processor to define the bound pointer using a variable, the variable to define the buffer bound of an array in a system memory random access memory, the system memory random access memory to implement the memory region.

21. The non-transitory machine readable storage medium as defined in claim 15, wherein the object code includes an explicit bound check before the instructions cause the at least one processor to instrument the object code with the buffer bound check.

22. An apparatus to protect memory from buffer overflow or underflow, the apparatus comprising:

means for accessing a configuration file defining a bound pointer, the bound pointer corresponding to a hardware-defined buffer bound for a memory region, the buffer bound not to be explicitly allocated in a program;

means for instrumenting object code with a buffer bound check based on the bound pointer; and means for generating hardened executable object code based on the object code, the buffer bound check, and the bound pointer, the bound pointer located in the hardened executable object code during a compilation phase.

23. The apparatus as defined in claim 22, wherein the configuration file is implemented using a platform configuration database entry.

24. The apparatus as defined in claim 23, wherein the platform configuration database entry is to configure a subsystem of a computer in association with execution of a platform basic input-output system (BIOS) or a unified extensible firmware interface.

25. The apparatus as defined in claim 23, wherein the platform configuration database entry is configured in a unified extensible firmware interface, the unified extensible firmware interface including a boot loader to load an operating system in a computer.

26. The apparatus as defined in claim 22, wherein the bound pointer is loadable in a global bounds table during runtime, the global bounds table is a memory protection extension (MPX) table.

27. The apparatus as defined in claim 22, wherein the memory region is a system memory random access memory.

28. The apparatus as defined in claim 22, wherein, before the instrumenting of the object code with the buffer bound check, the object code includes an explicit bound check.

* * * * *

UNITED STATES PATENT AND TRADEMARK OFFICE
CERTIFICATE OF CORRECTION

PATENT NO. : 11,360,907 B2  
APPLICATION NO. : 16/490523  
DATED : June 14, 2022  
INVENTOR(S) : Shi et al.

Page 1 of 1

It is certified that error appears in the above-identified patent and that said Letters Patent is hereby corrected as shown below:

In the Claims

Column 24, Line 11 (Claim 5), delete "implicit"

Column 24, Line 18 (Claim 7), delete "implicit"

Signed and Sealed this  
Twenty-second Day of November, 2022

Katherine Kelly Vidal  
*Director of the United States Patent and Trademark Office*